Dec. 5, 1950 W. A. LETSON 2,533,168
ANIMAL GUARD
Filed July 14, 1948 2 Sheets-Sheet 1

Inventor
WILLIAM A. LETSON
By

Dec. 5, 1950 W. A. LETSON 2,533,168
ANIMAL GUARD
Filed July 14, 1948 2 Sheets-Sheet 2
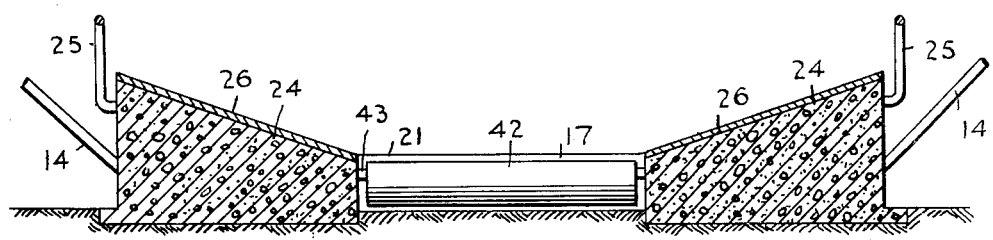
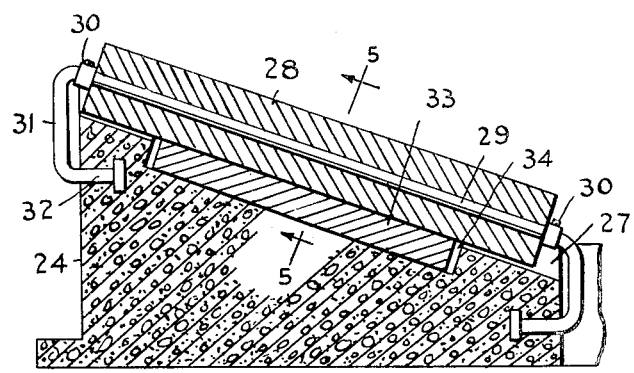
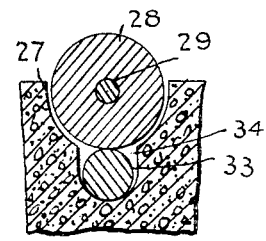
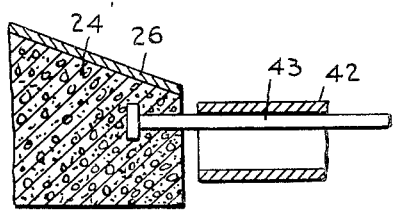
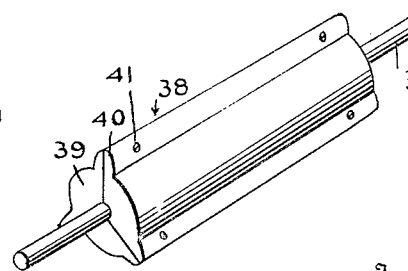
Inventor
WILLIAM A. LETSON
By Patented Dec. 5, 1950

2,533,168

UNITED STATES PATENT OFFICE 2,533,168

ANIMAL GUARD

William A. Letson, Kansas City, Mo., assignor of one-half to John G. Sheldon, Kansas City, Mo.

Application July 14, 1948, Serial No. 38,732

4 Claims. (Cl. 256—14)

My invention relates to improvements in guards for animals, such as cattle, goats, cows, sheep, etc.

An important object of the invention is to provide a guard which is particularly effective as a goat guard.

A further object of the invention is to provide a guard of the above-mentioned character for use at the entrance to a pen, and adapted to permit of the passage of trucks or other vehicles into and out of the pen, while preventing the escape of the animals.

A further object of the invention is to provide a guard of the above-mentioned character which will render it unnecessary for trucks to pass over a bridge as high or higher than the fence of the pen.

A further object of the invention is to provide a device of the above-mentioned character which will eliminate the necessity of swinging gates at the pens, and which will not injure the animals that attempt to traverse the guards.

A still further object is to provide a guard of the above-mentioned character which is simple in construction, durable, permanent and relatively inexpensive to build.

Other objects and advantages of the invention will be apparent during the course of the following description.

Figure 1:
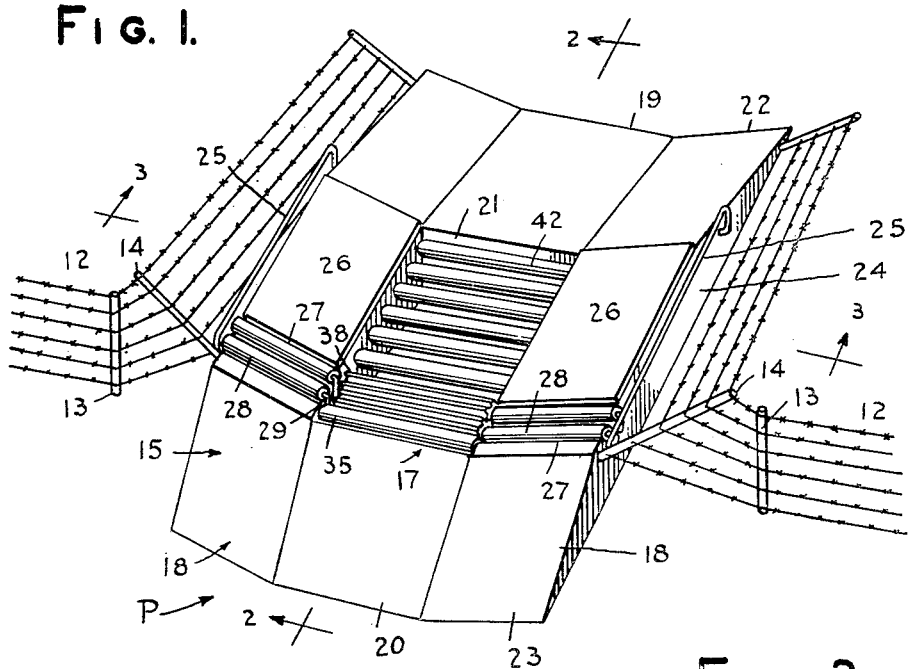
Figure 2:
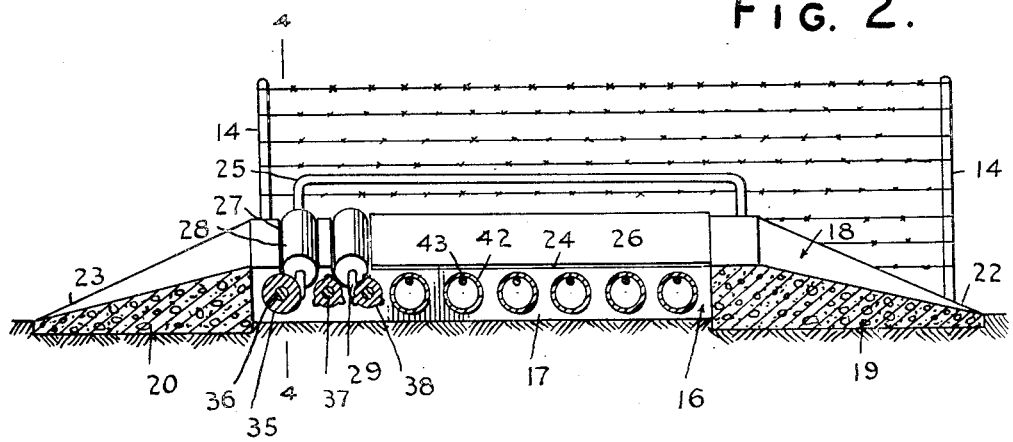
Figure 3:
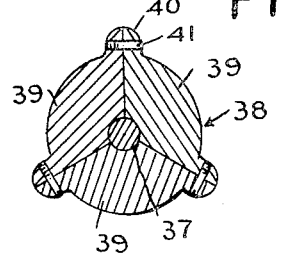

In the accompanying drawings, forming a part of this application, and in which like numerals are employed to designate like parts throughout the same, Figure 1 is a perspective view of an animal guard, showing parts of an associated pen, Figure 2 is a longitudinal vertical section taken on line 2—2 of Figure 1, Figure 3 is a transverse section taken on line 3—3 of Figure 1, Figure 4 is a transverse section taken on line 4—4 of Figure 2, Figure 5 is a transverse section taken on line 5—5 of Figure 4, Figure 6 is a central vertical longitudinal section through one of the loose or tubular rollers, Figure 7 is a perspective view of a triangular roller and, Figure 8 is a transverse vertical section through one of the triangular rollers.

In the drawings, where for the purpose of illustration is shown a preferred embodiment of the invention, the numeral 12 designates sections of fencing included in a pen P. The fence 12 includes posts 13 and 14, as shown. A passage is provided between the opposed groups of posts 14, and a guard 15 is arranged within this passage. This guard embodies a generally horizontal slab 16, preferably formed of concrete. This slab may be unitary and includes an inner strip 17 and outer strips 18. The inner strip 17 has end portions 19 and 20 which are longitudinally inclined inwardly and which may be transversely horizontal. Between these end portions 19 and 20, the inner strip has a recess 21. The outer strips 18 have end portions 22 and 23 and intermediate portions 24. The end portions 22 and 23 are longitudinally inclined upwardly inwardly, and are also transversely inclined downwardly inwardly. The intermediate portion 24 is longitudinally horizontal but is vertically inclined downwardly inwardly. The outer strips 18 from runways for the vehicle wheels. The posts 14 are anchored within the outer strips 18 and longitudinal guards 25 are also secured to the outer strips inwardly of the posts 14. The upper inclined faces of the intermediate portions 24 are covered by slippery plates or skids 26, preferably formed of polished metal, or any other suitable material capable of forming a slippery surface. These skid plates are held in position by any suitable means.

The intermediate portions 24 of the outer strips are provided near their ends next to the pen P with cylindrically curved recesses 27, Figures 1 and 4, receiving transversely inclined rollers 28, mounted upon rods 29 to turn thereon and held against longitudinal displacement by collars 30. The rods 29 have downwardly bent ends 31, provided with horizontal extensions 32 which are rigidly anchored within the intermediate portions 24. In order that the load may be taken from the rods 29, rollers 28 are supported by lower rolls 33, rotatable within recesses 34 and arranged beneath the rollers 28 and in alignment with the rods 29.

Arranged within the recess 21 next to the pen P is a horizontal transverse roller 35, carried by a horizontal shaft 36 and rotatable thereon. This transverse shaft is anchored within the intermediate portions 24. Arranged within the recess 21, next to and outwardly of the roller 35, are transverse horizontal shafts 37, having their ends anchored to the intermediate portions 24. Triangular or ribbed rollers 38 are rotatably mounted upon the horizontal shafts 37. Each roller 38 is formed in three segments 39, and these segments are provided with radially projecting rib sections 40, secured together by pins or screws 41. The rib sections form radial ribs. The rollers 38 and 35 are freely rotatable. Arranged within the recess 21 outwardly of the rollers 38 are loose tubular rollers 42, mounted upon horizontal transverse rods 43, which are anchored to the intermediate portions 24. The internal diameters of the tubular rollers 42 are much larger than the diameters of the rods. The rollers 42 are arranged between the skids or plates 26, as shown.

In use, a truck or light vehicle may be driven into or out of the pen P as desired. The wheels of the vehicle will run over the runways or strips 18 and engage upon the inclined slippery plates 26 and side rollers 28, which elements will not interfere with the travel of the vehicle. The runways 18 are relatively wide and considerably wider then the tires of the truck. The runways are also relatively low as compared to the height of the fence, so that the trucks have a relatively slight grade to negotiate. The guard rails 25 tend to prevent the vehicle wheels from running off of the runways. The center rollers 35, 38 and 42 will provide sufficient rolling surface for trailers which may be equipped with a third or center wheel. The guard will prevent the escape of cattle, particularly goats, from within the pen P. If the animal attempts to pass between the runways 18, it will first be confronted with the inner roller 35. If the foot of the animal touches this roller or any other rollers between the runways 18, instinct will prevent a further attempt to escape. If the animal should step forwardly upon rollers 38 or 42, such rollers will revolve and permit the passage of the hooves of the animal between them. The rollers are designed so that they will not tend to injure the animal attempting to escape. If the animal attempts to pass over the runways 18, it is first confronted with the roller 23, which will rotate when touched. If the animal should succeed in crossing the rollers 28, it will step upon the slippery plate 26. This vertically inclined plate will cause the animal to slide inwardly and its legs will pass between the inner rollers.

It is to be understood that the form of my invention herewith shown and described is to be taken as a preferred example of same, and that various changes in the shape, size, and arrangement of parts may be resorted to, without departing from the spirit of my invention or the scope of the subjoined claims.

Having thus described my invention, what I claim is:

1. An animal guard for use in connection with a pen to permit of a motor vehicle being driven over the guard into and out of the pen, comprising an elongated unitary concrete slab, said slab including outer elongated strips and an inner elongated strip, the wheels of the motor vehicle travelling longitudinally over the outer strips, the outer elongated strips having end portions and intermediate portions, the end portions having upper faces vertically inclined in a direction longitudinally of the outer strips, the intermediate portions having upper faces which are substantially horizontal in a direction longitudinally of the outer strips and transversely vertically inclined about axes parallel with the longitudinal axes of the outer strips and the direction of travel of the motor vehicle over the strips, metal plates mounted upon the inclined faces of the intermediate portions and held correspondingly inclined by such faces and having their upper faces smooth so that animals will slip thereon, the inner longitudinal strip having a recess formed in its intermediate portion adjacent to the intermediate portions of the outer strips, and spaced animal obstruction elements mounted within the recess.

2. An animal guard for use in connection with a pen to permit of a motor vehicle being driven over the guard into and out of the pen, comprising outer elongated concrete strips and an intermediate elongated concrete strip, the wheels of the motor vehicle travelling longitudinally over the outer strips, the outer strips having end portions and intermediate portions, the end portions having upper faces vertically inclined in a direction longitudinally of the outer strips and also transversely inclined about axes parallel with the longitudinal axes of the outer strip, the upper faces being inclined downwardly toward the inner strip, the intermediate portions having upper faces which are substantially horizontal in a direction longitudinally of the outer strips and transversely vertically inclined about axes parallel with the longitudinal axes of the outer strips and the direction of travel of the motor vehicle upon the outer strips, the upper faces of the intermediate portions being inclined downwardly toward the inner strip, metal plates mounted upon the inclined faces of the intermediate portions and held correspondingly inclined by such faces and having their upper faces smooth so that animals will slip thereon, said metal plates terminating substantially within the length of the intermediate portions so that the end portions are uncovered, the inner longitudinal strip having a recess in its intermediate portion adjacent to the intermediate portions of the outer strips, and spaced animal obstruction elements within the recess.

3. An animal guard for use in connection with a pen to permit a motor vehicle being driven over the guard into and out of the pen, comprising longitudinal track strips, the motor vehicle travelling longitudinally over the track strips, the track strips having their upper faces transversely vertically inclined about axes parallel with the longitudinal axes of the strips and the direction of travel of the motor vehicle upon the strips, said inclined faces being smooth so that animals will slip thereon, the inclined faces extending downwardly toward their inner edges, said track strips having a recess between them, and animal obstruction means mounted within the recess.

4. An animal guard for use in connection with a pen to permit a motor vehicle being driven over the guard into and out of the pen, comprising longitudinal concrete track strips, the motor vehicle traveling longitudinally over the track strips, the track strips having upper faces transversely vertically inclined about axes parallel with the longitudinal axes of the strips and the direction of travel of the motor vehicle upon the strips, metal plates mounted upon the upper inclined faces of the track strips and held in the inclined position of the track strips, the metal plates having upper smooth faces so that animals will slip thereon, the inclined plates extending downwardly toward their inner edges, said track strips having a recess between them, and animal obstruction means mounted within the recess.

WILLIAM A. LETSON.

REFERENCES CITED

The following references are of record in the file of this patent:

UNITED STATES PATENTS

| Number | Name | Date |
|---|---|---|
| 739,590 | Von Daake | Sept. 22, 1903 |
| 772,364 | Mallia | Oct. 18, 1904 |
| 778,235 | Ferrieel | Dec. 27, 1904 |
| 895,548 | Flewellin et al. | Aug. 11, 1908 |
| 947,268 | Wood | Jan. 25, 1910 |
| 956,295 | Cox | Apr. 26, 1910 |
| 1,071,146 | Dennis | Aug. 26, 1913 |
| 1,254,072 | Russell | Jan. 22, 1918 |
| 1,757,024 | Solis | May 6, 1930 |

FOREIGN PATENTS

| Number | Country | Date |
|---|---|---|
| 4052 of 1926 | Australia | Sept. 30, 1926 |